United States Patent [19]

Sprangle et al.

[11] Patent Number: 5,353,291
[45] Date of Patent: Oct. 4, 1994

[54] LASER SYNCHROTRON SOURCE (LSS)

[75] Inventors: Phillip A. Sprangle, Potomac;
Antonio Ting, Silver Spring; Eric H.
Esarey, Chevy Chase, all of Md.;
Amnon Fisher, Alexandria, Va.;
Gerard Mourou, Ann Arbor, Mich.;
Ravindra Sudan, Ithaca, N.Y.

[73] Assignee: The United States of America as represented by the Secretary of the Navy, Washington, D.C.

[21] Appl. No.: 20,158

[22] Filed: Feb. 19, 1993

[51] Int. Cl.[5] .............................................. H01S 3/30
[52] U.S. Cl. ......................................... 372/5; 372/20;
372/94; 372/10; 372/99; 372/37
[58] Field of Search ................... 372/5, 20, 10, 94, 99, 372/37; 315/5

[56] References Cited

U.S. PATENT DOCUMENTS

| | | | |
|---|---|---|---|
| 4,598,415 | 7/1986 | Luccio et al. | 372/119 |
| 4,748,629 | 5/1988 | Edlin et al. | 372/2 |
| 4,817,124 | 3/1989 | Ketterson et al. | 372/5 |
| 4,951,304 | 8/1990 | Piestrup et al. | 378/119 |
| 4,961,056 | 10/1990 | Yu | 315/5 |
| 4,975,917 | 12/1990 | Villa | 372/5 |
| 5,107,508 | 4/1992 | Piestrup | 372/5 |
| 5,247,562 | 9/1993 | Steinbach | 372/22 |

OTHER PUBLICATIONS

Steinbach, "A Compact, Tunable Source Of Monochromatic Highly-Directional X-Rays," Lincoln Laboratory Rpt No. ACC-4, Aug. 21, 1992.
Sprangle et al., "Tunable, Short Pulse Hard X-Rays From A Compact Laser Synchrotron Source," SSRL Workshop on Fourth Generation Light Sources, pp. 289-298, 24-27 Feb. 1992.
Spranle et al., "Tunable Short Pulse Hard X-Rays From A Compact Synchrotron Source," Naval Research Rpt NRL/MR14790-92-6963, Jul. 16, 1992.
Sudan, "A Note On A Tunable Source Of Short Pulse X-Rays," Unpublished, Oct. 17, 1992.
Esarey et al., "*Laser Synchrotron Radiation As A Compact Source Of Tunable Short Pulse Hard X-Rays*", Proc. Frth. Ann. Free Elec. Conf., Kore, Japan, Aug. 23–28, 1992 (As published in Nuclear Instruments and Methods in Physics Research A331, pp. 545–549, 1993.

Primary Examiner—Léon Scott, Jr.
Attorney, Agent, or Firm—Thomas E. McDonnell; Charles J. Stockstill

[57] ABSTRACT

The laser synchrotron source (LSS) utilizes a high peak power or high average power laser to generate within a vacuum chamber a laser beam travelling in one direction to interact with an electron beam traveling in an opposite direction in order to generate high-power x-rays. A ring resonator formed by a plurality of mirrors directs the laser beam in a closed loop to impact with the electron beam to produce x-rays. Concave mirrors in the ring resonator focus the laser beam upon the point where the laser beam interacts with the electron beam to intensify the laser energy at that point. When a radio frequency linear accelerator (rf linac) is used to produce the electron beam, x-rays having a short pulse length are generated. When a betatron is used as an electron source, x-rays having a long pulse length are generated.

33 Claims, 2 Drawing Sheets

LASER SYNCHROTRON SOURCE (LSS)

BACKGROUND OF THE INVENTION

1. Field of the Invention

The Laser Synchrotron Source (LSS) is a compact source of short-pulse, coherent or incoherent (near monochromatic), tunable, hard x-rays.

2. Description of the Related Art

Conventional x-ray sources rely on either the Bremsstrahlung radiation produced when energetic electrons are decelerated by high Z (atomic number) materials in common x-ray tubes, or synchrotron radiation produced by ultrahigh energy electron beams passing through magnetic undulators or dipoles in a Storage Ring Synchrotron Source (SRSS).

The x-rays produced in common x-ray tubes (Bremsstrahlung) have the undesirable properties of low power, long-pulses or continuous wave (CW), broadband, uncollimated, line spectra confined to atomic transitions and hence not tunable, unpolarized, and incoherent radiation.

The SRSS also have a number of unfavorable features and characteristics. Such sources require highly energetic electron beams, typically many GeVs which in turn require large and expensive facilities. The x-ray radiation generated by the SRSS has relatively long duration (>100 ps) pulses, broadband, incoherent, low energy (<50 keV), fixed polarization, not tunable and incapable of frequency chirping.

SUMMARY OF THE INVENTION

One object of the laser synchrotron source (LSS) is to provide a device for achieving intense hard x-ray production having ultra-short pulses and extremely high peak power utilizing an ultra-high intensity laser whose polarization and chirping can be controlled.

Another object of the LSS is to provide an x-ray source that is compact, requires low power and limited radiation shielding.

The LSS is comprised of a high peak power or high average power laser to generate a laser beam which produces x-rays upon interacting with an electron beam in a vacuum environment. The electron beam is generated by either a radio frequency linear accelerator or betatron. A multiple of mirrors forming a ring resonator reflect the laser beam in a continuous loop so that it may be reused over and over again. The energy in the laser beam is replenished by being recycled in an amplifier circuit to replace the energy lost through scattering and diffraction at the mirrors and upon impact with the electron beam.

DESCRIPTION OF THE PREFERRED EMBODIMENTS

The laser synchrotron source (LSS) produces a laser beam and an electron beam which interact to generate hard x-rays.

Figure 1:
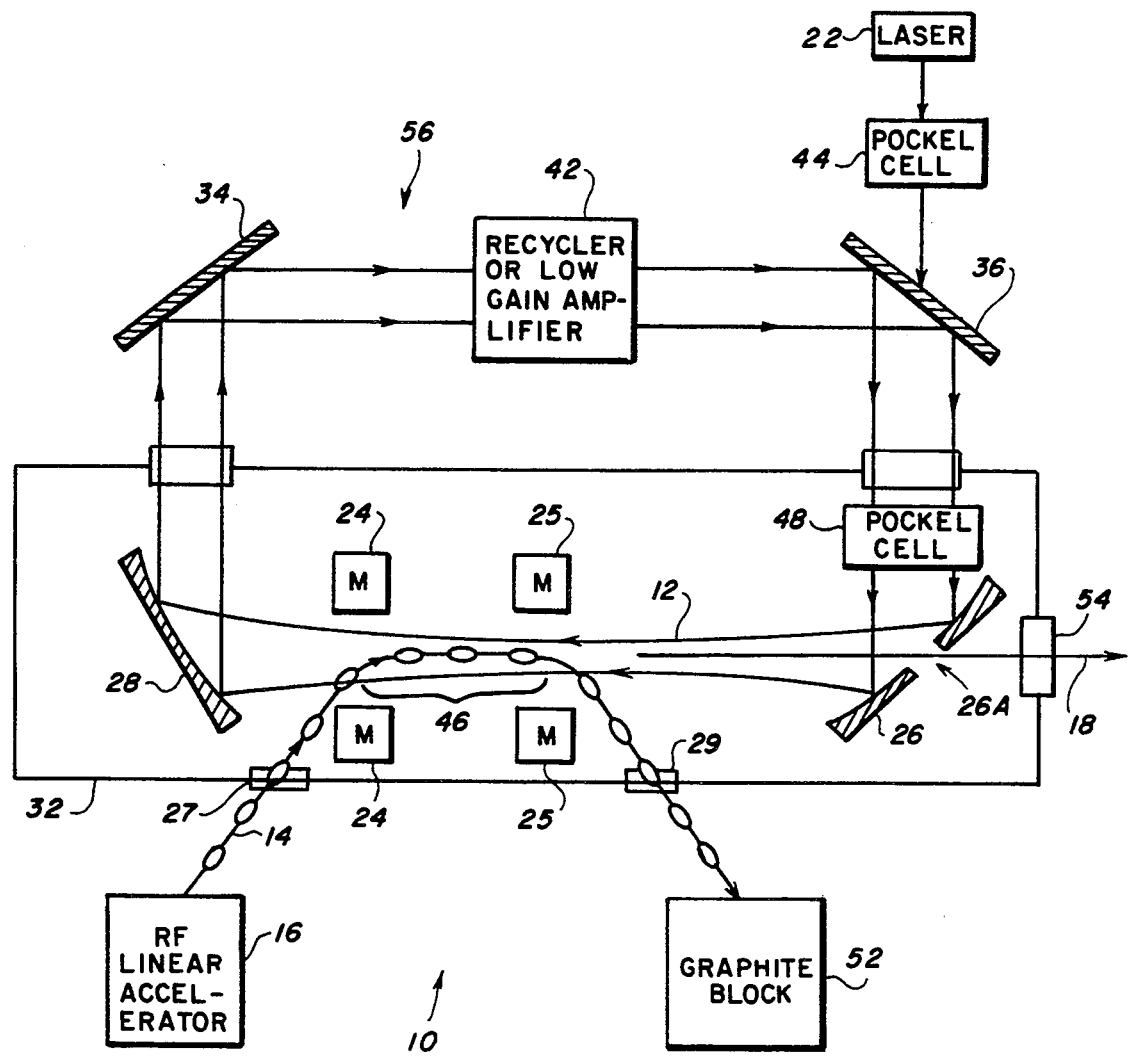
FIG. 1 is a schematic diagram showing a laser synchrotron source (LSS) utilizing a Radio Frequency Linear Accelerator (rf linac) to generate an electron beam.

In the preferred embodiment, FIG. 1, the laser source 22 is a high peak power laser; alternatively, a high average power laser, i.e., a solid state laser, such as a high power modified Nd:YAG laser or equivalent, may be used.

The preferred laser 22 is a Table-Top Terawatt ($T^3$) laser system manufactured by Positive Light of Los Gatos, CA, wherein a low energy pulse from an ultrashort pulse, mode-locked oscillator is temporally stretched, amplified, and recompressed by the chirped pulse amplification (CPA) technique to produce a ~1 psec laser pulse with peak laser power in the 1–10 TW power range. $T^3$ lasers can be repetition rated (rep-rated) up to ~1 kHz at the ~1 TW level. Any high peak power laser, other than a $T^3$, may be utilized. High peak power lasers, however, are commonly located in large laser facilities such as Lawrence Livermore National Laboratories, Livermore, CA. However, these large lasers do not perform the desired function of being capable of utilization in a small laboratory facility.

It is essential that the x-ray beam generated by the interaction of the laser beam 12 be coherent as opposed to incoherent. In the coherent x-ray beam, the radiation of the laser beam 12 is very intense, very directional and its frequency content is very pure. In the incoherent x-ray beam, there is a broadband spectrum and some of the optical properties found are undesirable. However, as a general matter the x-rays within an LSS x-ray beam 18 are in both coherent and incoherent states and the state selected for operation depends upon the parameters selected for operation of the LSS. If proper parameters are not present within the system, incoherent x-rays will be emitted. To achieve the coherent state, the parameters of the laser must be properly tuned so that the laser beam 12 and the electron beam 14 will intensely interact and produce a coherent x-ray beam 18.

A relatively low energy (<100 MeV) Radio-Frequency Linear Accelerator (rf linac) 16, or cyclic electron (betatron) source, producing an electron beam and the sub-picosecond laser pulses from the $T^3$ laser system 22 propagate in opposite directions to each other. Intense x-ray radiation 18 is produced by linear and nonlinear Thomson scattering of the laser radiation off the energetic electrons. In addition, coherent x-ray radiation 18 may also be generated by self-amplification of the spontaneous (Thomson radiation) through the free electron laser (FEL) mechanism. Operation at harmonics of the doppler upshifted laser frequency can be achieved by increasing the intensity of the incident laser field.

The production of intense hard x-rays 18 is achieved as a result of the ultra-high intensity of the laser radiation from the $T^3$ laser system 22 interacting with the electron beam 14. The $T^3$ laser can generate a laser intensity in excess of $10^{18}$ W/cm$^2$ where electron motion in the laser radiation field can become relativistic. This creates new regimes of interaction unattainable by any existing or proposed x-ray generation schemes. Extremely high energy (~10 keV–~1000 keV) x-rays 18 can be generated as either the fundamental or the harmonics of the doppler upshifted laser radiation using an electron beam 14 or a cold, high density plasma.

Ultra-short pulses of x-rays 18 can be generated. The upper limit of the pulse length is determined by the shortest micropulse structure available for the electron beam 14, which is ~1 ps ($10^{-12}$ sec). Shorter x-ray pulses 18 can be achieved by having the electron beam 14 and the laser beam 12 cross at an angle. The lower limit of the pulse length is set by the shortest pulse attainable for the T³ laser 22 pulse.

The intense radiation from the T³ laser system 22 can act as an electromagnetic wiggler for the electron beam 14, and coherent x-ray 18 radiation can be produced through the laser pumped FEL mechanism. Because of the ultra-intense and short pulses from the T³ laser 22, x-rays produced in the LSS 10 have extremely high peak power.

As stated above, picosecond x-ray pulses 18 are generated by interacting a high peak power laser beam 12 with a picosecond micropulse electron beam 14 from an rf linac 16. The beam generated by the laser 22 enters the ring resonator or ring resonator circuit 56 formed by two mirrors 26 and 28 located within a vacuum or interaction chamber 32, and two mirrors 34 and 36 preferably located outside of the interaction or vacuum chamber 32 reflect the laser beam 12 in a closed loop.

The mirrors 26, 28, 34 and 36 are all standard optical mirrors. Mirrors 34, and 36 are high power dielectric mirrors. Mirrors 26 and 28 are off-axis paraboloid concave mirrors to focus the laser beam 12 as it interacts with the electron beam 14 which increases the intensity of the laser beam 12. Window 26A is constructed of beryllium to allow the passage of the x-rays generated when this constricted laser beam 12 strikes the electron beam 14.

The laser beam 12 is gated by using such optical devices as Pockel cells 44 and 48 to change the polarization of the laser beam 12. Each cell 44 and 48 acts like a gate that can open and shut, allow the pulses from the laser 22 to enter into the ring resonator, or ring resonator circuit, 56 through the mirror 36 in a first polarized state. After passing through mirror 36, the laser beam 12 is rotated by Pockel cell 48 to an opposing polarization. The laser beam 12, upon striking mirror 36 on subsequent passages, is prevented from exiting the ring resonator 56 by virtue of the opposite polarization of the laser beam 12 while in the ring resonator 56.

The electron beam 14 from the rf linac 16 enters the vacuum or interaction chamber 32 through a vacuum port 27 and upon entering the path of the laser beam 12 is bent by magnets (M) 24 so as to travel in an opposite direction parallel to the path of the laser beam 12. The relativistic electron beam interacting with the incident counterstreaming laser beam emits synchrotron radiation, or x-rays 18. The emitted x-rays 18 exit the vacuum chamber 32 through a window 54 to impact upon a target surface (not shown) for application. After interacting with the laser beam 12, the electron beam 14 is then bent by magnets (M) 25 so as to exit the interaction chamber through a vacuum port 29 where it can either be recycled in the rf linac 16 or disposed of in a graphite block 52.

The output of the rep-rated rf linac 16 consists of a series of micropulses and macropulses. In typical rf linacs 16, the micropulse time ($\tau_m$) is $\tau_m = L_b/c \simeq 10$ psec and the macropulse is $T_m \simeq 20$ µsec. The micropulse ($f_m$) and macropulse ($F^m$) rep-rate is micropulse time ($\tau_m$) is $\tau_m = L_b/c \simeq 10$ psec and the macropulse is $T_m \simeq 20$ µsec. The micropulse ($f_m$) and macropulse ($F^m$) rep-rate is typically $f_m \simeq 3$ GHz and $F_m \simeq 100$ Hz. The separation of the series of micropulses is $\Delta T_m = 1/f_m \simeq 350$ psec, and the overall duty factor for the full electron beam 14 pulse train is $D = F_m f_m T_m \tau_m \simeq 6 \times 10^{-5}$. Due to the relatively low duty factor ($D = 0.1^{-5}$) associated with rf linacs 16, a rep-rated LSS 10 requires a laser 22 system that has high average power.

After interacting with the electron beam 14, the laser beam 12 is reflected outside of the interaction chamber 32 by mirrors 28 and 34 into either a high energy recycler (for a high peak power laser) where the beam is stretched amplified and recompressed or a low gain amplifier 42 (for a high average power laser) where the beam is amplified, to compensate for any losses due to scattering or diffraction as the result of the operation of the mirrors and impact with the electron beam. The rejuvenated laser beam 12 is then reflected by mirror 36 back into the ring resonator circuit 56.

It is implicitly assumed in the LSS generation of x-rays 18 that all the electrons in the micropulse are acted upon by approximately the same incident laser field amplitude. This requires that the electron beam 14 micropulse length be somewhat less than the laser 22 Rayleigh length, i.e., $L_b < Z_R$, where $L_b$ is pulse length and $Z_R$ is Rayleigh length. To maintain a uniform high efficiency operation the spot size of the incident laser beam 12 should be somewhat larger than the electron beam 14 radius, i.e., $r_o > r_b$, where $r_o$ is spot size and $r_b$ is beam radius.

Slippage between the x-ray pulse 1e and the electron micropulse 14 is negligibly small compared to the electron micropulse 14 length. Hence, the x-ray pulse 1e structure is essentially identical to that of the electron beam pulse structure, i.e., psec electron pulses 14 generate psec x-ray pulses 1e. Both the electron beam 14 and x-ray pulse 18 are overlapped and travel together at nearly the velocity of light through the counterstreaming incident laser pulse 12. Ultra-short x-ray pulses 18 ($\sim$ psec) can also be generated using long electron pulses 14 ($>>$ psec).

Nominally a pulsed laser configuration rep-rated at the frequency of electron micropulses is employed. The laser pulse train is arranged to circulate in a ring resonator 56 configuration with an optical path length which is an integral multiple of $\Delta T_m$, the separation of the micropulses. The electron beam 14 micropulses are brought into one arm of the laser resonator with a turning magnet 24 and synchronized with the laser 12 pulses so that they interact with each other in the vicinity of the focal point 46. Synchronization between the laser 12 pulses and electron beam 14 pulses is achieved by vicinity of the focal point 46. Synchronization between the laser 12 pulses and electron beam 14 pulses is achieved by driving the laser mode-locked oscillator (not shown) at subharmonics of the master oscillator signal (not shown) of the rf linac 16.

Synchronization between the single laser pulse 12 and the rf linac 16 electron beam 14 is achieved with a laser-triggered photocathode (not shown) at the beam injector (not shown) of the rf linac 16. Part of the laser beam pulse 12 from the T³ laser 22 is diverted to illuminate the photocathode (not shown) of the rf linac 16. Table I shows the required parameters for a high peak power LSS 10 using a rf linac 16 to generate psec x-ray pulses 18 having $6 \times 10^9$ photons/pulses.

Figure 2:
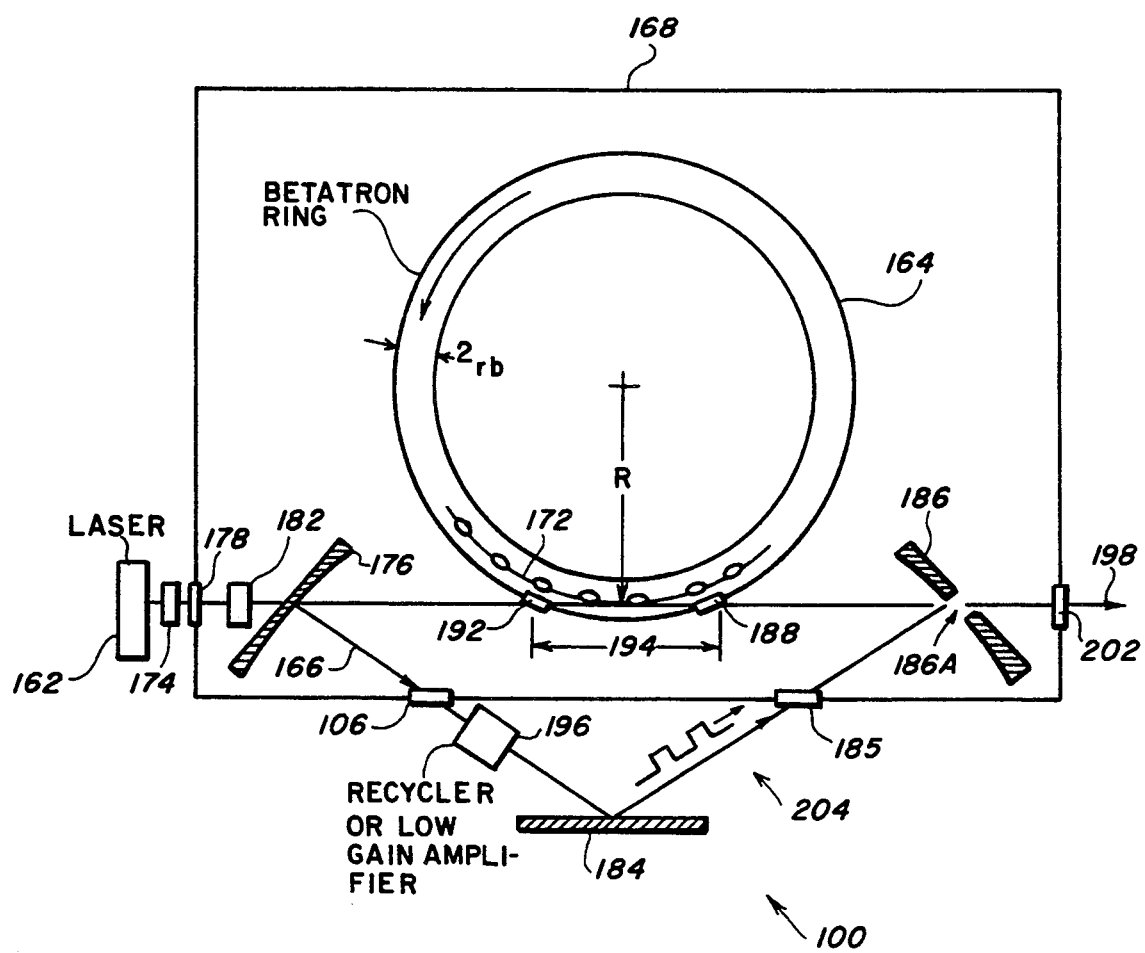
FIG. 2 is a schematic showing a Laser Synchrotron Source (LSS) utilizing a betatron to generate an electron beam.

In a second preferred embodiment 100, FIG. 2, utilizes either a T³ laser 162 or a solid state laser, as discussed above, as the source of a laser beam 166, and a betatron 164 as the source of an electron beam 172.

When utilizing the betatron 164 as an electron source, the ring resonator or ring resonator circuit 204 is comprised of three mirrors 176, 184 and 186 (having similar characteristics to the mirrors previously discussed) arranged in a triangular mirror configuration. However, the triangular configuration is immaterial, the configuration of the mirror may assume a plurality of mirrors.

TABLE I

High Peak Power Laser Synchrotron Source Using an RF Linac

| | |
|---|---|
| Incident Laser Parameters | |
| Wavelength, $\lambda_o$ | 1 μm |
| Energy/Pulse, $E_o$ | 20 J |
| Peak Power, $P_o$ | 10 TW |
| Laser Pulse Length, $L_o/c$ | 2 psec |
| Spot Size, $r_o$ | 50 μm |
| Rayleigh Length, $Z_R$ | 0.8 cm |
| Electron Pulse Parameters | |
| Beam Energy, $E_b$ | 50–250 MeV |
| Beam Current, $I_b$ | 200 A |
| Beam Pulse Length, $L_b/c$ | 1 psec |
| Beam Radius, $r_b$ | 50 μm |
| Beam Energy Spread $(\Delta E/E_b)_{int}$ | 0.5% |
| Beam Emittance, $\epsilon_n$ | 5 mm-mrad |
| X-Ray Pulse Parameters | |
| Photon Energy $E_p$ | 50–1200 keV |
| Peak Photon Flux, F | $6 \times 10^{21}$ photons/sec(*) |
| Photon Pulse Length, $L_b/c$ | 1 psec |
| Photons/Pulse, $FL_b/c$ | $6 \times 10^9$ hotons/pulse(*) |
| Peak Brightness, B | $6 \times 10^{19}$–$1.5 \times 10^{21}$(+) |
| Angular Spread, $\Theta \sim 1/\gamma$ | $10^{-2}$ mrad |

(*)Includes all photons within the ~1/μ angle, implying ~100% BW.
(+)The unit for brightness is photons/sec-mm$^3$-mrad$^2$ (0.1% BW).

Mirrors 176 and 186 are off-axis parabaloid concave mirrors and mirror 186 has a beryllium window 186A to allow the passage outside of the interaction chamber 168 of the x-rays 198 generated by the interaction of electron beam 172 and a laser beam 166.

The laser beam 166 enters the ring resonator circuit from a laser source 162 through a laser window 178 and the mirror 176 after being gated by Pockel cells 174 and 182, as discussed in the first preferred embodiment, to prevent the laser beam 166 from escaping the ring resonator circuit 204 on subsequent passages. Mirror 176 reflects the laser beam 166 out of the interaction chamber 168 through a laser window 106 to a second mirror 184 after passing through either a recycler (in the case of a high peak power laser) or a low gain amplifier (in the case of a high average power laser) 196. The recycler or low gain amplifier 196 operates as previously described. Mirror 184 then reflects the laser beam 166 through laser window 185 to a third mirror 186 where the laser beam 166 is constricted and enters the betatron 164 through a first vacuum port 188 and impacts the electron beam 172. Upon the interaction of the laser beam 166 with the electron beam 172, x-rays 198 are emitted, as previously described. These x-rays 198 pass out of the vacuum chamber 168 through a window 202 for application as desired. The characteristics of the x-rays 198 generated utilizing the betatron are as previously described when utilizing a rf linac.

A conventional air core betatron 164 produces ~100 A of circulating current at energies of ~50 MeV. This betatron 164 is extremely compact, varying in radius from ~4–24 cm. If a modified betatron 164, having additional stabilizing magnetic fields to stably confine and accelerate high currents, is used in the embodiment it will produce >1 kA at energies of >20 MeV. The beam radius of the modified betatron is 1 m.

The interaction distance $L_{int}$ 194 is given by $L_{int} \simeq (2Rr_b)^{\frac{1}{2}}$, where R is the major radius of the betatron 164 and $r_b$ is the horizontal radius of the electron beam 172. An average spectral brightness of $\sim 3 \times 10^{11}$ photons/sec-mm$^2$mrad$^2$(0.1% BW) at x-ray photon energy of 50 keV is obtained. Due to the CW nature of both the electron 172 and laser 166 beams, the duty factor is equal to 1. This leads to an increase of the average photon flux, when compared to the high average power LSS using an rf linac 196. Table II shows the parameters for a high average power LSS using a conventional betatron.

A wide range of wavelengths is available for the x-rays 198 generated by the LSS 100. For a fixed electron energy, discrete wavelengths at odd harmonics of the laser frequency are produced. These harmonics can be continuously tuned in frequency by adjusting the energy of the electron beam 172. Control of polarizations of the x-rays 198 with fast response times can be easily achieved by controlling the polarization of the laser 162.

TABLE II

High Average Power Laser Synchrotron Source Using a Conventional Betatron

| | |
|---|---|
| Incident Laser Parameters | |
| Wavelength, $\lambda_o$ | 1 μm |
| Average Circulating Power, $P_o$ | 5 kW |
| Average Laser Amplifier Power $P_{in}$ | 100 W |
| Spot Size, $r_o$ | 50 μm |
| Rayleigh Length, $Z_R$ | 0.8 cm |
| Electron Pulse Parameters | |
| Beam Energy, $E_b$ | 50–250 MeV |
| Beam Current, $I_b$ | 100 A |
| Beam Major Radius, R | 25 cm |
| Beam Cross-section, $A_b$ | $\pi \times 50 \times 150$ μm$^2$ |
| Interaction Distance, L | 1.7 cm |
| Beam Energy Spread $(\Delta E/E_b)_{int}$ | 1% |
| X-Ray Pulse Parameters | |
| Photon Energy $E_b$ | 50–1200 keV |
| Average Photon Flux, <F> | $3 \times 10^{13}$ photons/sec(*) |
| Average Spectral Brightness, <B> | $3 \times 10^{11}$–$7.5 \times 10^{12}$(+) |

(*)Includes all photons within the ~1/γ angle, implying ~100% BW.
(+)The unit for brightness is photons/sec-mm$^2$-mrad$^2$(0.1% BW).

The availability of elliptical (or circular) and linearly orthogonal polarizations would be crucial to many magnetic probing of matter experiments with x-rays.

By frequent chirping the laser pulse (which is inherent for a T$^3$ laser system that employs the chirped pulse amplification method), x-ray pulses with frequency chirping can be obtained from a LSS. Frequency chirping is very useful in material research using short pulse x-rays.

A LSS, as shown in the previously described embodiments, has several advantages. First, the cross-section of the x-ray source in a LSS is given by the overlap of the radiation spot size and electron beam size. This improves substantially the spatial coherence of the x-ray emitted from a LSS. Secondly, the apparatus comprising the LSS is compact and requires a space only tens of square meters as opposed to tens of thousands of square meters for the storage ring synchrotron source (SRSS) and the current generation of laser sources capable of generating high peak power laser pulses. Thirdly, the LSS has low power requirements as compared to other storage ring devices due to the much lower energy of the electron beams from rf linacs. Further, the LSS requires substantially less radiation shielding due to the lower energies of the electron beams. Lastly, high-density, low temperature plasma can also be used in place of an electron beam. In this case, only harmonics of the backscattered laser radiation will be produced.

The picosecond x-rays generated by the LSS are useful in materials studies for studying various chemical transitions in chemical reactions. In medical research, the longer x-rays generated utilizing the betatron are useful.

The design and operation of the LSS has been described in the papers by Sprangle et al., *Tunable, Short Pulse Hard X-Rays from a Compact Laser Synchrotron Source*, SSRL Workshop on Fourth Generation Light Sources, pp. 289–298, 24–27 Feb. 1992; Sprangle et al., *Tunable, Short Pulse Hard X-rays from a Compact Laser Synchrotron Source*, Naval Research Laboratory Report No. NRL/MR/4790-92-6963, Jul. 16, 1992; and Sudan, *A Note on a Tunable Source of Short Pulse X-Rays*, unpublished, Oct. 7, 1992; which are herein incorporated by reference.

Although the invention has been described in relation to exemplary embodiments thereof, it will be understood by those skilled in this art that still other variations and modifications can be affected in these preferred embodiments without detracting from the scope and spirit of the invention. The limits on this invention are as described in the claims.

What is claimed is:

1. A device comprised of:
   means for generating a tunable laser beam;
   a plurality of mirrors arranged so as to form a ring resonator for confining the laser beam;
   means for generating an electron beam to interact with the laser beam so as to produce photons in the form of hard x-rays by Thompson scattering of the laser beam by the electron beam; and
   a vacuum chamber forming an interaction chamber where the laser beam and the electron beam interact to product the hard x-rays.

2. The device of further comprising means for interrupting the laser beam so as to form a pulsed laser beam for injection into the ring resonator in a synchronous manner.

3. The device of claim 2 wherein said means for interrupting the laser beam is a plurality of Pockel cells.

4. The device of claim 2 where the means for interrupting the laser beam so as to form a pulsed laser beam for injection into the rig resonator in a synchronous manner further comprises a means for controlling the hard x-ray polarization by controlling the laser beam polarization.

5. The device of further comprising means for amplifying the laser beam to compensate for losses resulting from diffraction of the pulsed laser beam, imperfect reflectivity of the mirrors and scattering of the laser beam by the electron beam.

6. The device of claim 5 wherein said means for amplifying the pulsed laser beam is a recycler that stretches, amplifies and recompresses the pulsed laser beam.

7. The device of, claim 5 wherein said means for amplifying the pulsed laser beam is a low gain amplifier.

8. The device of claim 1 wherein said laser source is a laser operating in a 1–10 TW power range.

9. The device of claim 8 wherein said laser source is a laser utilizing chirped pulse amplification.

10. The device of claim 8 wherein said laser source is a solid state laser.

11. The device of claim 10 wherein said solid state laser is a high power modified Nd:YAG laser.

12. The device of claim 1 wherein said laser source is a laser operating in a 5 kW power range.

13. The device of claim 1 wherein the plurality of mirrors are arranged in a rectangular configuration forming the ring resonator.

14. The device of claim 1 wherein the plurality of mirrors are arranged in a triangular configuration forming the ring resonator.

15. The device of claim 1 wherein at least two mirrors of said plurality of mirrors are off-axis paraboloid concave mirrors focusing the laser beam onto the point within the interaction chamber where the laser beam interacts with the electron beam.

16. The device of claim 15 wherein at least one of said concave mirrors has a window to allow the flow of x-rays outside of the interaction chamber.

17. The device of claim 16, wherein said window is made of beryllium.

18. The device of claim 1 wherein at least one of said mirrors is a high power dielectric mirror.

19. The device of claim 1 wherein said means for generating an electron beam is a radio frequency linear oscillator.

20. The device of claim 1 wherein said means for generating an electron beam is a betatron.

21. A method for generating x-rays, comprising the steps of:
   generating subpicosecond laser pulses with a high peak power laser operating in a 1'10 TW power range;
   injecting the laser pulses into a ring resonator in a first direction thereby forming a continuous loop;
   generating an electron beam in a linear accelerator moving in a second direction opposite to the first direction of the laser pulse; and
   focusing the laser pulses upon a point within an interaction chamber where the laser pulses and the electron beam interact by Thomson scattering so as to produce hard x-rays.

22. The method of claim 21 further comprising the step of amplifying the laser pulses moving in the first direction in the ring resonator to replenish the laser energy lost due to diffraction of the laser pulses, imperfect reflectivity within the ring resonator, and scattering due to the interaction of the laser beam with the electron beam.

23. The method of claim 22 further comprising the step of amplifying said laser pulses in the ring resonator to replenish the laser energy lost due to diffraction of the laser pulses, imperfect reflectivity within the ring resonator, and scattering due to the interaction of the laser beam with the electron beam.

24. A method for generating hard x-rays, comprising the steps of:
   generating laser pulses having short length and high average circulating power of approximately 5 kW;
   injecting the laser pulses into a ring resonator in a first direction thereby forming a continuous loop;
   generating in a betatron an electron beam moving in a second direction opposite to the direction of the laser pulses; and
   focusing the laser pulses on a point within the betatron so as to intersect the electron beam tangentially thereby causing hard x-rays to be produced via Thomson scattering.

25. A device for generating hard x-rays comprised of:
   means for generating a short, tunable laser pulse;
   means for confining and recirculating the laser pulse in a predetermined direction;
   means for generating an electron beam circulating in a predetermined direction, opposite to the direction of movement of the laser pulse; and means for generating hard x-rays by Thomson scattering of the laser pulse and the electron beam moving in an opposite direction to the laser pulse.

26. The device of claim 25 wherein the means for generating hard x-rays is comprised of an interaction chamber and a plurality of focusing magnets and optical mirrors.

27. A method for generating hard x-rays, comprising the steps of:

generating a laser beam having a high peak power of subpicosecond duration so as to form a pulsed laser beam directing the pulsed laser beam in a first direction in a continuous loop in a ring resonator;

generating an electron beam in a linear accelerator, said beam being directed in a second direction opposite to the direction of the pulsed laser beam; and focusing the pulsed laser beam upon a point within an interaction chamber where the laser beam and the electron beam interact at a predetermined intersection angle thereby producing hard x-rays pulses of a predetermined energy level by the Thomson scattering of the laser beam by the electron beam.

28. The method of claim 27 further comprising the step of amplifying the pulsed laser beam in the ring resonator to replenish the laser energy lost by diffraction of the laser pulses, imperfect reflectivity within the ring resonator, and scattering due to the interaction of the laser beam with the electron beam.

29. The method of claim 27 further comprising the step of reducing the pulse length of the generated had x-rays by varying the intersection angle between the laser beam and the electron beam.

30. A method for generating hard x-rays, comprising the steps of:

generating a laser beam having high average power and short pulse length;

injecting the laser beam in a first direction in a continuous loop in a ring resonator;

generating in a betatron an electron beam moving in a second direction opposite to the direction of the laser beam; and focusing the laser beam on a point within the betatron thereby causing the laser beam and the electron beam to interact within said betatron so as to produce hard x-ray pulses by Thomson scattering of the laser beam by the electron beam.

31. The method of claim 30 further comprising the step of increasing the energy level of the x-ray pulses by using an electron beam of a predetermined quality to produce self amplified harmonic scattering of the laser pulses thereby generating coherent harmonic hard x-rays.

32. A method for increasing x-ray energy, comprising the steps of:

generating laser pulses with a high peak power laser;

injecting the laser pulses into a ring resonator in a first direction;

generating free electrons composed of electrons within a relativistic electron beam in a linear accelerator, said electrons moving in a second direction opposite to the direction of the laser pulse; and focusing the laser pulses within an interaction chamber so as to achieve ultrahigh intensity where the laser pulses and the electron beam interact within the interaction chamber via nonlinear Thomson scattering to produce hard x-rays.

33. The method of claim 32 further comprising the step of increasing the energy level of the x-ray pulses by using an electron beam of a predetermined quality to produce self amplified harmonic scattering of the laser pulses thereby generating coherent harmonic hard x-rays.

* * * * *